United States Patent [19]
Folkenroth et al.

[11] 3,982,718
[45] Sept. 28, 1976

[54] OPERATORY CHAIR OPERATING MECHANISM

[75] Inventors: Richard P. Folkenroth; William G. Mader, both of York; Ralph J. Williams, New Oxford, all of Pa.

[73] Assignee: Dentsply Research & Development Corporation, Milford, Del.

[22] Filed: July 31, 1975

[21] Appl. No.: 600,703

[52] U.S. Cl. .................................. 248/421; 187/18; 248/425; 254/122;
[51] Int. Cl.[2] .................... F16M 13/00; B66B 11/04
[58] Field of Search ............ 14/45; 52/109; 74/521; 108/145; 187/8.57, 8.72, 18; 248/396, 421, 425, 277; 254/122; 297/330, 347, 349

[56] References Cited

UNITED STATES PATENTS

| | | | |
|---|---|---|---|
| 232,352 | 9/1880 | Horton | 248/421 |
| 575,684 | 1/1897 | Baxter | 297/349 X |
| 958,000 | 5/1910 | Peterson et al. | 248/421 X |
| 1,365,252 | 1/1921 | Langill | 187/18 |
| 1,902,282 | 3/1933 | Hultgren | 248/425 |
| 2,402,579 | 6/1946 | Ross | 187/18 X |
| 2,706,102 | 4/1955 | Cresci | 254/122 X |
| 2,749,969 | 6/1956 | Tatter | 297/345 |
| 2,821,242 | 1/1958 | Manegold | 248/421 |
| 3,240,529 | 3/1966 | Boulsover | 297/327 |
| 3,472,488 | 10/1969 | Naughton | 297/347 X |
| 3,623,707 | 11/1971 | Klopp | 187/18 X |
| 3,804,460 | 4/1974 | Leffler | 297/330 |

FOREIGN PATENTS OR APPLICATIONS

| | | | |
|---|---|---|---|
| 248,357 | 12/1963 | Australia | 254/122 |
| 1,211,725 | 10/1958 | France | 187/18 |
| 886,947 | 10/1943 | France | 297/330 |
| 67,448 | 3/1958 | France | 187/8.72 |

*Primary Examiner*—Lawrence J. Staab

[57] ABSTRACT

An operatory chair, such as a dental chair, having an upper supporting member to which the seat and back unit of an operatory chair may be attached, particularly pertaining to the mechanism by which said supporting member for the seat and back is raised and lowered. The preferred construction comprises a pair of sets of pivotally connected links arranged in lazy tong manner, said links being operated by linkage mechanism actuated by a rotatable screw and follower in such manner that the movement of the supporting member for the seat and back is smooth and relatively slow, particularly at the commencement of elevating movement so as not to include sudden and rapid upward movement as is conventional with typical lazy tong structures used in jacks and the like.

5 Claims, 9 Drawing Figures

OPERATORY CHAIR OPERATING MECHANISM

CROSS-REFERENCE TO RELATED APPLICATION

The subject matter of the present application is readily adapted for use as raising and lowering means for the Adjustable Chair, comprising the subject matter of pending U.S. application, Ser. No. 551,873, filed Feb. 21, 1975, in the names of Larry A. Hain and Ronald C. Webb.

BACKGROUND OF THE INVENTION

The use of lazy tong linkages in many types of tools and implements has been found to be highly advantageous over the years to translate in particular a limited amount of movement in one direction to a much greater amount of movement in a direction transverse thereto. For example, in gripping devices, a plurality of pairs of pivoted links have been connected together to form handles on the outer ends of a pair of links at one end of the structure, while gripping members were provided on the outer ends of the pair of links at the opposite ends of the structure. By moving the handles together, the linkages were projected outwardly substantially at a right angle to the direction in which the handles are moved together. One characteristic of this type of structure, however, resides in the fact that, because of the geometry of linkages of this type, the initial movement of the handles toward each other produces a very sudden and rapid movement of the opposite ends of the linkages in the direction transverse to and outwardly from the direction of movement in which the handles are moved together. Because of this, lazy tong arrangements are not adaptable for use in all types of situations in which otherwise they would be considered to be useful.

The adaptation of lazy tong linkages to chairs of different kinds also extends back for many years. One such example is U.S. Pat. No. 232,352, dated Sept. 21, 1880, to Horton. Many others could be cited which were originated during the latter half of the nineteenth century and the early part of the twentieth century. The majority of these, as with the Horton patent, however, are not power-operated, and it must be borne in mind that operatory chairs of modern type, especially dental chairs, are relatively heavy, whereby the application of power to actuate the lazy tong sets of linkages is desirable.

A more recent patent in the chair art employing lazy tongs which are not power-operated comprise U.S. Pat. No. 2,749,969, dated June 12, 1956, to Tatter. Although manually operated, it can be appreciated from this patent that the employment of lazy tongs for purposes of disposing the seat of a chair at different levels, is desirable and said patent also employs simple locking means to secure the seat of the chair at a desired elevation when that position is reached.

A hand-operated type of lazy tong arrangement in a chair structure is represented in U.S. Pat. No. 2,821,242, dated Jan. 28, 1958 to Manegold. This chair primarily is intended as an invalid chair and is mechanically operated by screw means to raise and lower the seat which is supported by lazy tong linkages.

The adaptation of lazy tongs specifically to relatively modern dental chairs which are operated by power means are represented in the following patents:

| | | |
|---|---|---|
| 3,240,529 | G. Boulsover | March 15, 1966 |
| 3,472,488 | J.L. Naughton | OCt. 14, 1969 |
| 3,804,460 | D.F. Leffler | April 16, 1974 |

In regard to the Boulsover patent, the lazy tong structure is disposed only at one side of the central vertical axis of the chair, the seat of the chair primarily being raised and lowered by means of a central hydraulic cylinder which, in order to elevate the seat of the chair to a reasonably high elevation, necessarily must have a cylinder unit of at least half said heights, whereby such cylinder restricts the distance to which the seat-supporting member may be lowered. In this regard, in conventional modern dental practice at present, one of the principal requisites is that the seat of the chair be capable of being lowered to a much lower position than previously used in dental chairs, due to the fact that dentists and dental assistants largely operate while seated upon relatively low stools or other forms of seats, either adjacent or connected to the dental chair.

The Naughton structure also is raised and lowered by a pair of telescoping central tubes which are moved longitudinally by a screw disposed vertically within said tubes, the outermost tube being connected to pivot means of the lower pair of each set of connected lazy tong links but, because of the telescoping tube arrangement, the amount of lowering movement which is permissible is less than would otherwise be possible if the telescoping tube elevating means were not employed. Hence, for reasons similar to those set forth above relative to Boulsover's construction, the Naughton elevating means has limitations which do not meet present day requirements in dental chairs, as well as other similar operatory chairs.

The Leffler elevating construction does not actually employ lazy tong linkages but, rather, utilizes parallel linkages to insure perpendicular movement of the seat-supporting member at the upper end of the vertically adjustable base arrangement and the electric motor means for operating the linkages also is carried by the linkages during the operation thereof and comprises a somewhat bulky arrangement limiting the position to which the seat-supporting member may be lowered.

SUMMARY OF THE INVENTION

It is the principal object of the present invention to obviate the aforementioned undesirable features in lazy tong type linkage arrangements employed in base units adapted to support operatory chairs, such as dental chairs and the like, by providing in association with the lazy tong assemblies, a linkage system which is interconnected to pivot means for at least one pair of connected links of said lazy tong assembly, and power means interconnected to said linkage system operable to actuate the lazy tong arrangement in both expanding and contracting directions, in a smooth manner relatively free from sudden acceleration or deceleration, said linkage system also being of such nature that the chair-supporting member on the upper end of the base which is actuated by the lazy tong assembly may be lowered to a substantially lower position than present chair-supporting base units are capable of achieving.

It is another object of the invention to employ lazy tong assemblies which have at least two pairs of crossed and pivotally connected lazy tong links and pivot means which connect one of said pairs of links together being attached to the lowermost pair of crossed links, and said linkage system which expands and contracts said lazy tong assemblies comprises a lever type link pivotally connected to said pivot members.

A further object of the invention is to employ in said linkage system which expands and contracts the lazy tong assembly, a bell crank unit pivotally connected intermediately of the ends thereof to the upper end of a vertically extending pivot member which is fixed at its lower end to a horizontal base plate of the chair base unit.

A still further object of the invention is to employ a pair of parallel sets of lazy tong assemblies, said sets respectively being spaced horizontally apart and operable in unison, and said power means comprising a substantially horizontal screw member which is driven by an electric motor reversibly operable in opposite directions, said screw having a follower which is connected by additional linkage means to one end of said bell crank unit and the opposite end of said bell crank unit being connected by additional links to said pivots of said lower pairs of lazy tong links in each set thereof.

Still another object of the invention is to provide suitable guide means for the uppermost and lowermost ends of one of the links of each lazy tong assembly, said guide means being horizontal and respectively supported by the upper member on said chair base unit and said aforementioned base plate of said chair base unit.

One further object of the invention is to provide transversely extending brace members fixed at the opposite ends thereof respectively to certain links of each pair of parallel sets of lazy tong assemblies in order to brace said assemblies against wabbling in transverse directions parallel to the pivoted axes of the connections for the links of said lazy tong assemblies.

For purposes of compactness, the power means which comprises a reversible electric motor, rotatable screw, and follower on the screw are disposed adjacent the aforementioned base plate of said base unit and are positioned within a vertical plane intermediately between said pairs of parallel sets of said lazy tong assemblies.

One additional object of the invention is to compose said bell crank unit of a pair of similar plate-like bell crank members which are maintained in transversely spaced relationship upon a shaft which is supported by the upper end of said vertical pivot member and the opposite ends of said shaft respectively being connected to said bell crank members, said pivot member also being within a vertical plane disposed intermediately between said pairs of parallel sets of lazy tong assemblies.

One other object of the invention is to provide in the base unit an additional plate which underlies said aforementioned base plate, said plate being connected by a vertical pivot for relative rotational movement about said pivot, one of said plates also including anti-fraction members which engage the other plate to minimize power requirements to rotate said chair base unit and a seat, back and occupant supported thereon when it is desired to change the position of an occupant by moving said aforementioned structures about a vertical axis.

Ancillary to the foregoing object, it is a further object to provide brake means which will lock said aforementioned plates in a desired adjusted position after one of the same has been moved relative to the other about said vertical axis.

Details of the foregoing objects and of the invention, as well as other objects thereof, are set forth in the following specification and illustrated in the accompanying drawings comprising a part thereof.

DETAILED DESCRIPTION

Figure 1:
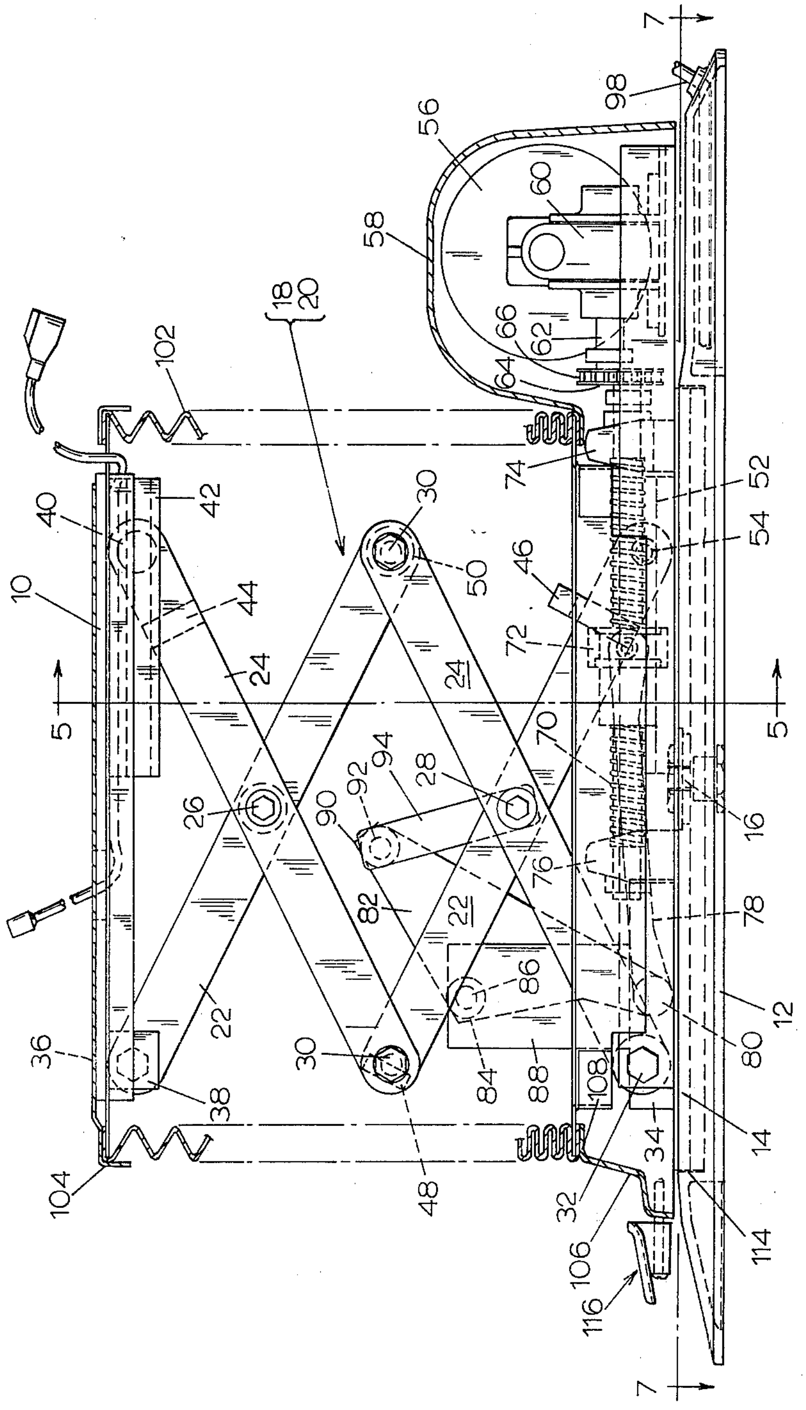
FIG. 1 is a side elevation, partly in section, illustrating the lazy tong assembly arrangement of the present invention and the linkage means by which said arrangement is expanded and contracted, the position shown in said figure being intermediate of the maximum uppermost and lowermost position of the chair seat supporting member at the upper end of said chair base unit.
Figure 2:
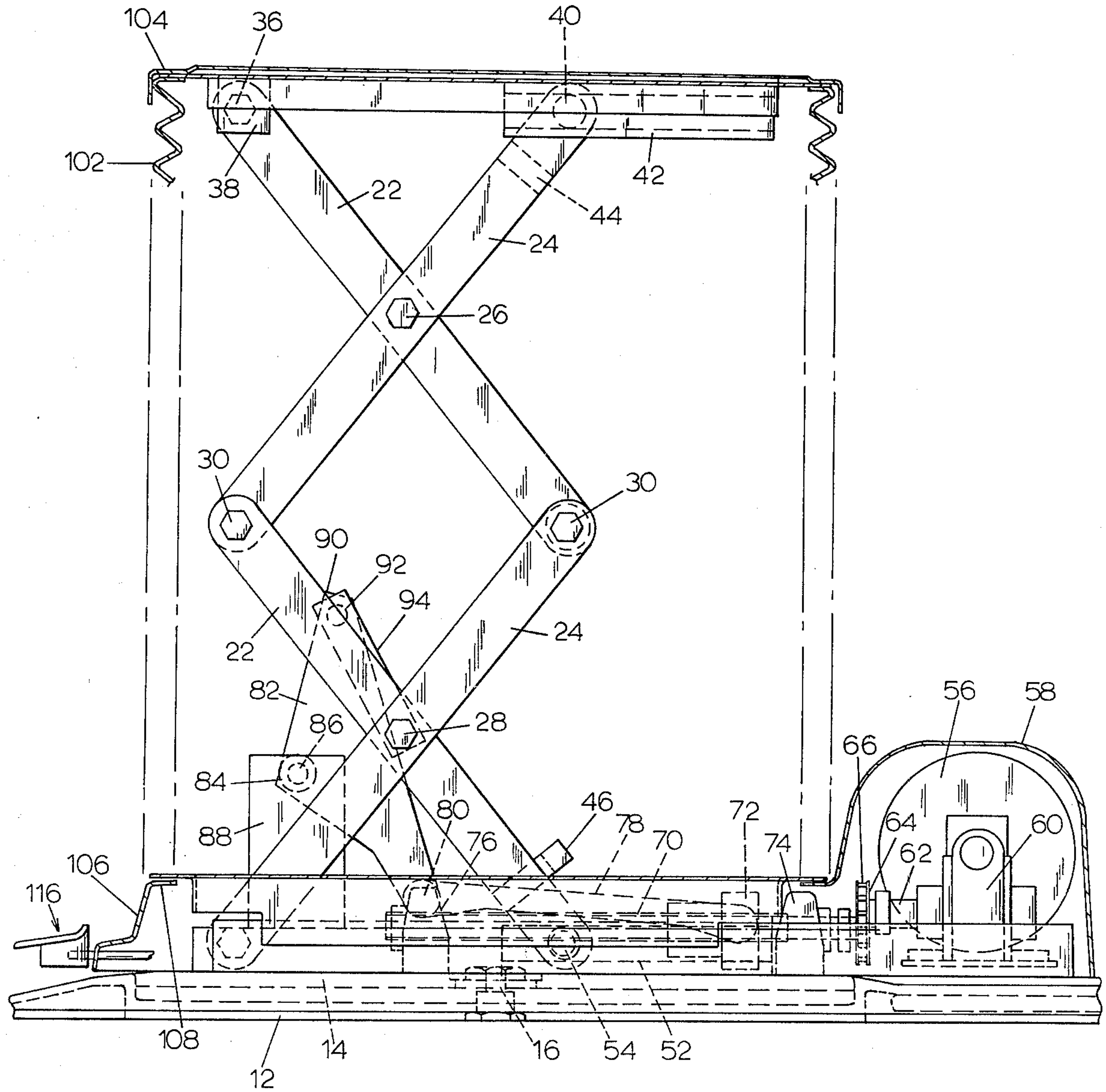
FIG. 2 is a view similar to FIG. 1 but showing lazy tong assembly in substantially maximum expanded or elevated position.
Figure 3:
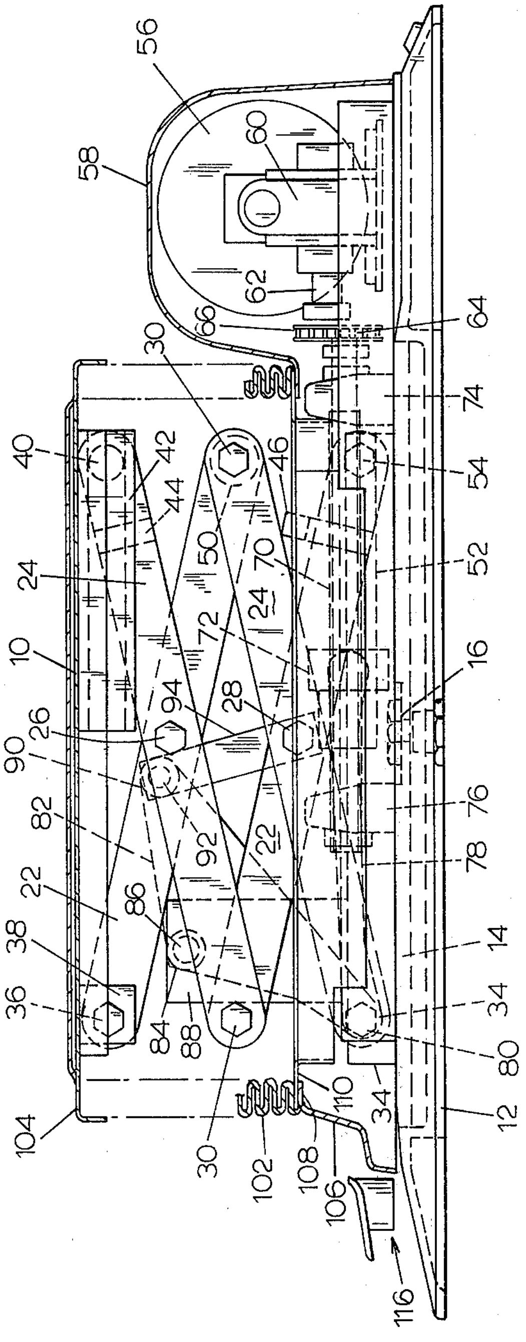
FIG. 3 is a view similar to FIGS. 1 and 2, but showing the lazy tong assembly in the substantially lowermost, contracted position thereof.

Referring particularly to FIGS. 1-3, the chair base unit comprising the present invention essentially consists of an upper supporting plate 10 to which the seat, back and footrest unit of an operatory chair, such as dental chair, may be attached for support and also to be raised and lowered to a desired position by said base unit. Said base unit also comprises a flat bottom plate 12, which is adapted to rest upon a supporting surface such as a floor, and a base plate 14, which is attached to bottom plate 12 by a short vertical pivot 16, for rotation of the base plate 14 and all of the mechanism supported thereby relative to the bottom plate 12.

Figure 4:
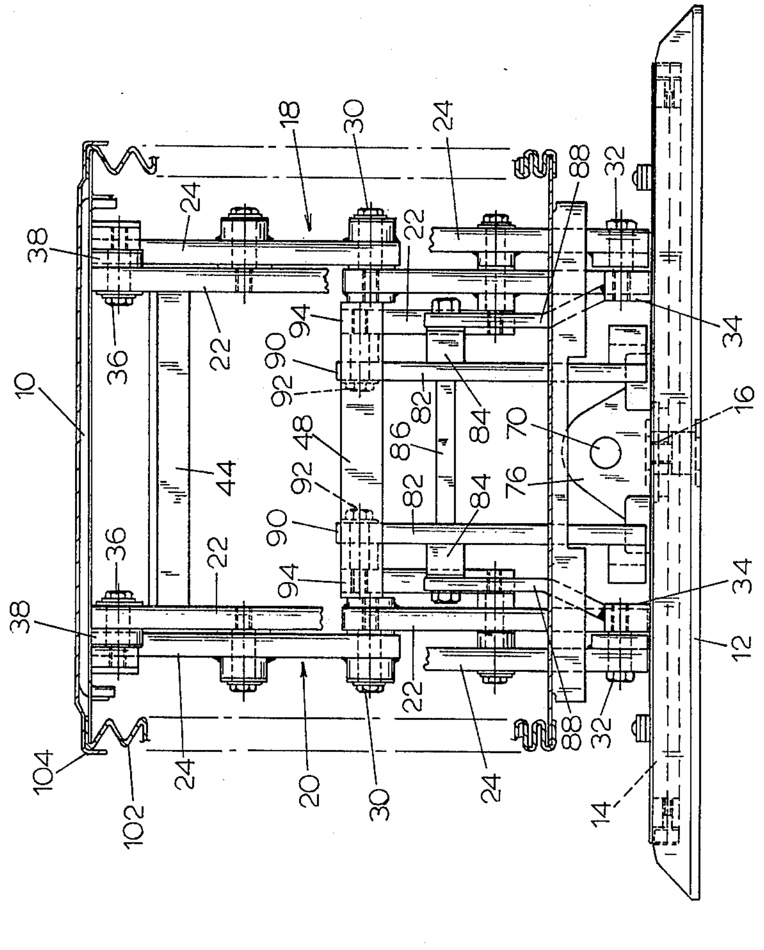
FIG. 4 is an end view of the base unit shown in FIG. 1 as seen from the left-hand end thereof.
Figure 5:
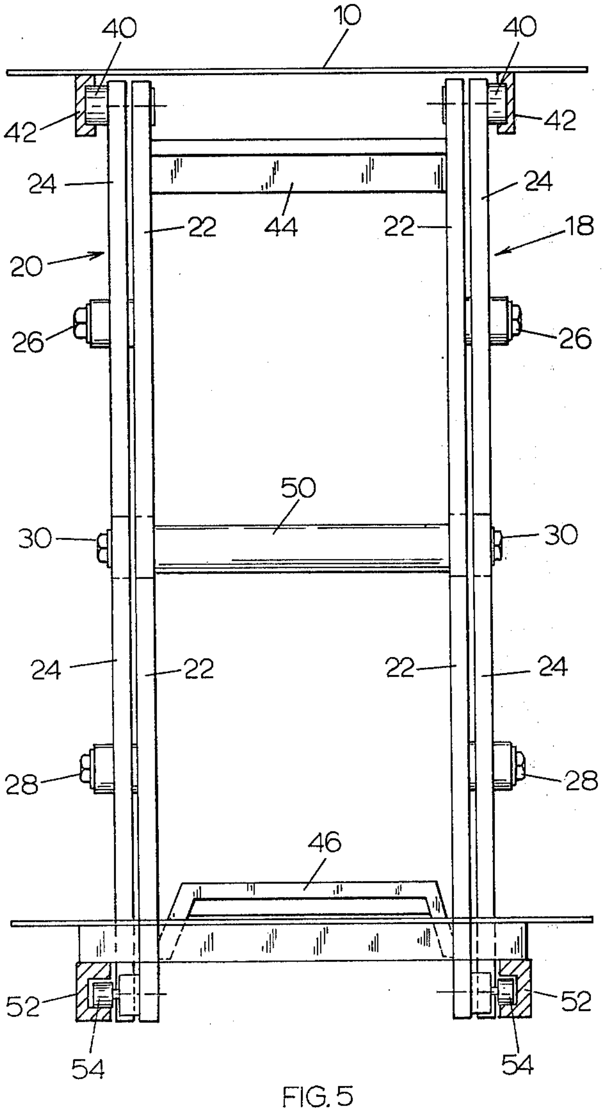
FIG. 5 is a vertical elevation of the linkage mechanism and particularly illustrating bracing thereof as seen generally along the line 5—5 of FIG. 1.

The mechanism for moving the upper plate 10 with respect to the base plate 14 comprises the subject matter of the present invention. Specifically, as will be seen from FIGS. 1-3, this mechanism comprises a pair of lazy tong assemblies 18 and 20 which, as best seen from FIGS. 4 and 5, are spaced transversely a substantial distance. Each assembly, 18 and 20, preferably comprises two pairs of crossed links 22 and 24. Each of said pairs of links 22 and 24 are pivotally connected intermediately of the ends thereof by appropriate pivot bolts 26, which connect the upper pair of lazy tong links, and pivot bolts 28 connect the lower pair of such cross links. The lower ends of links 22 and 24 of the upper set are connected to the upper ends of said links of the lower set by additional pivot bolts 30.

The lower ends of links 24 of the lower set are pivotally connected by additional pivot bolts 32 to fixed brackets 34, which are best shown in FIGS. 1–4, the same being fixed to the upper surface of base plate 14. Correspondingly, the upper end of links 22 of the upper set are pivotally connected by additional pivot bolts 36 to brackets 38, which are fixed to supporting plate 10 of the upper end of the base unit. The upper ends of links 24 of the upper set preferably have an anti-friction roller 40 fixed thereto for longitudinal movement within a guide channel 42, one of such channels being disposed adjacent each side edge of the upper supporting plate 10, as shown in FIGS. 1–3 and particularly in FIG. 5.

For purposes of bracing the transversely spaced parallel sets of lazy tong assemblies 18 and 20 against lateral skewing movement or any other type of transverse movement between the upper supporting plate 10 and the base plate 14, appropriate brace members are connected to the various links of the lazy tong assemblies. As best shown in FIG. 5, a transverse brace bar 44 is welded at its opposite ends respectively to the upper ends of links 24 of the upper set thereof, the position of said brace bar also being illustrated in FIGS. 1–3. Another, somewhat U-shaped transverse brace bar 46, extends between the lower ends of links 22 of the lower set thereof. Further, still another transverse brace bar 48, best shown in FIGS. 1 and 4, extends between the terminal upper end of links 22 of the lower set thereof, it being understood that FIG. 4 is an end view of the base unit as seen from the left end of FIG. 1. In FIG. 4, the transverse brace bar 48 obscures a cylindrical brace bar 50, which extends between the lower ends of the links 22 of the upper set thereof, as best shown in FIG. 5, in which the cylindrical brace bar 50 obscures the transverse brace bar 48, which is at the opposite end of the base from the cylindrical brace bar 50. Further, the brace bar 50 may either be tubular or solid, and in any event, the pivot bolts 30 preferably are threaded into tapped holes in the opposite ends of the cylindrical brace bar 50. It readily can be visualized from the foregoing that the linkage structure is amply braced against lateral, skewing or slanting movement with respect to a vertical plane extending from the base of the unit and disposed between the vertically spaced sets of lazy tong assemblies.

Figure 6:
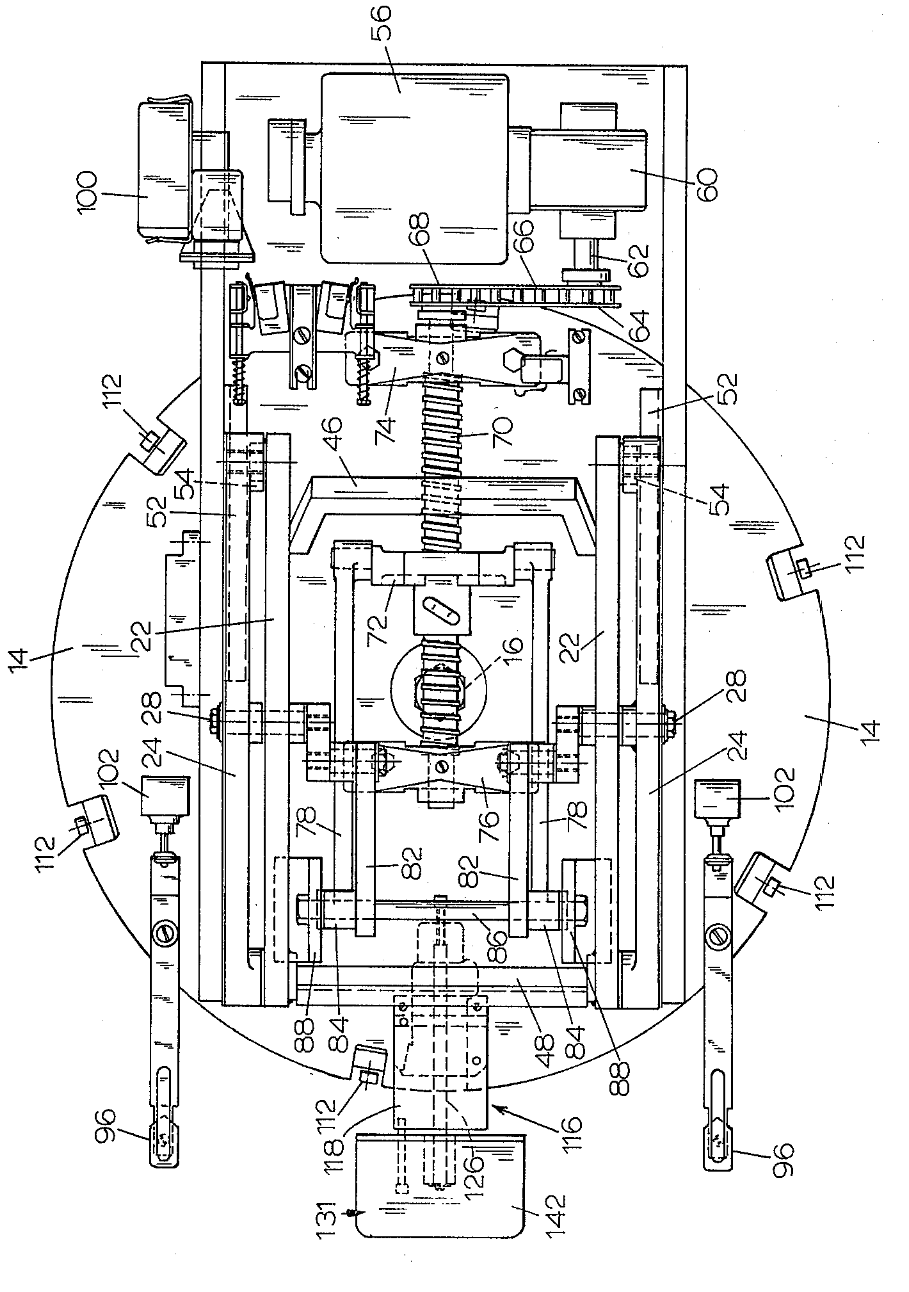
FIG. 6 is a top plan view of the chair base unit arranged in the position illustrated in FIG. 2 with the uppermost plate removed in order to expose details of the mechanism therebelow.

All of the various ends of the links of the several sets of lazy tong assemblies have been accounted for in the foregoing with the exception of the lower ends of links 22 of the lower set thereof. As best shown in FIG. 6, however, there is secured to base plate 14 outwardly from the lower ends of links 22 of the lower set, a pair of guide channels 52, which are horizontal and open faces thereof are disposed inwardly toward each other respectively for the reception of anti-friction guide members 54. In operation, the guide members 54 and the anti-fraction rollers 40 simply move longitudinally within their respective guide channels 52 and 42, respectively, at the lower and upper ends of the base unit as the lazy tong assemblies respectively are expanded and contracted simultaneously to raise and lower the upper supporting plate 10. Hence, it will be seen that rigid transverse brace members 44, 46, 48 and 50 provide stability for the lazy tong assemblies to resist swaying or skewing in one transverse direction, whereas the pivot bolts 36 and anti-friction followers 40 at the upper end of the lazy tong assemblies, together with the pivot bolts 32 and anti-friction guide or follower members 54 at the lower ends of said lazy tong assemblies provide resistance to swaying or skewing of the lazy tong assemblies in a lateral direction transverse to the direction against which said rigid bracing members resist swaying or skewing.

POWER MECHANISM

The prime mover in the power mechanism by which the lazy tong assemblies 18 and 20 are expanded and contracted simultaneously comprises, preferably, an electric motor 56 of fractional horsepower rating, such as of the order of ⅛ horsepower, but such rating is not to be regarded as restrictive. However, because of the linkage mechanism, drive screw and other details of the power system which are described hereinafter, it will be seen that the base comprising the present invention for supporting, raising and lowering seat and back means connected thereto is very efficient and economical from the standpoint of power consumption. As shown in FIGS. 1–3, motor 56 is enclosed within a suitable housing 58 to provide suitable aesethics for that portion of the base. Also, the drive shaft of the motor 56 is connected to a gear reduction unit 60 which has an output drive shaft 62. Mounted on the outer end of drive shaft 62 is a drive sprocket 64 around which a sprocket chain 66 extends, the same also extending around a driven sprocket gear 68, see FIG. 6, which is fixed to one end of drive screw 70.

Drive screw 70 preferably is of the Acme type and extends through a transverse yoke 72 which has a central threaded bore complementary to screw 70. It is to be noted from FIGS. 1–3 that the screw 70 is substantially horizontal and parallel to base plate 14 and, from FIG. 6, it will be seen that said screw is substantially centrally between lazy tong assemblies 18 and 20. Opposite ends of the screw 70 are respectively rotatably supported within appropriate bearing blocks 74 and 76.

A pair of parallel connecting rods 78 are pivotally connected at one end to opposite ends of the transverse yoke 72, as clearly shown in FIG. 6, and the opposite ends are pivotally connected to one end 80 of a bell crank unit comprising a pair of similar bell crank members 82, the shape of which is best shown in FIGS. 1–3.

The bell crank members 82 readily may be formed from metal plate stock and the intermediate portion of each of said members 82 has a boss 84 connected thereto, such as by welding. Said intermediate portions and bosses 84 are bored respectively to receive the opposite ends of a transverse supporting shaft 86. The opposite terminal ends of shaft 86 extend through complementary holes formed in the upper ends of a pair of similar vertical plates which jointly comprise a composite pivot member 88 which is rigidly connected to and supported by base plate 14.

The opposite or upper ends 90 of bell crank members 82 are connected by pivots 92 respectively to one end of each of a pair of connecting links 94. The opposite ends of connecting links 94 are pivotally connected to pivot bolts 28, which also interconnect the lower pair of crossed links 22 and 24 of each of the lazy tong assemblies 18 and 20.

Figure 7:
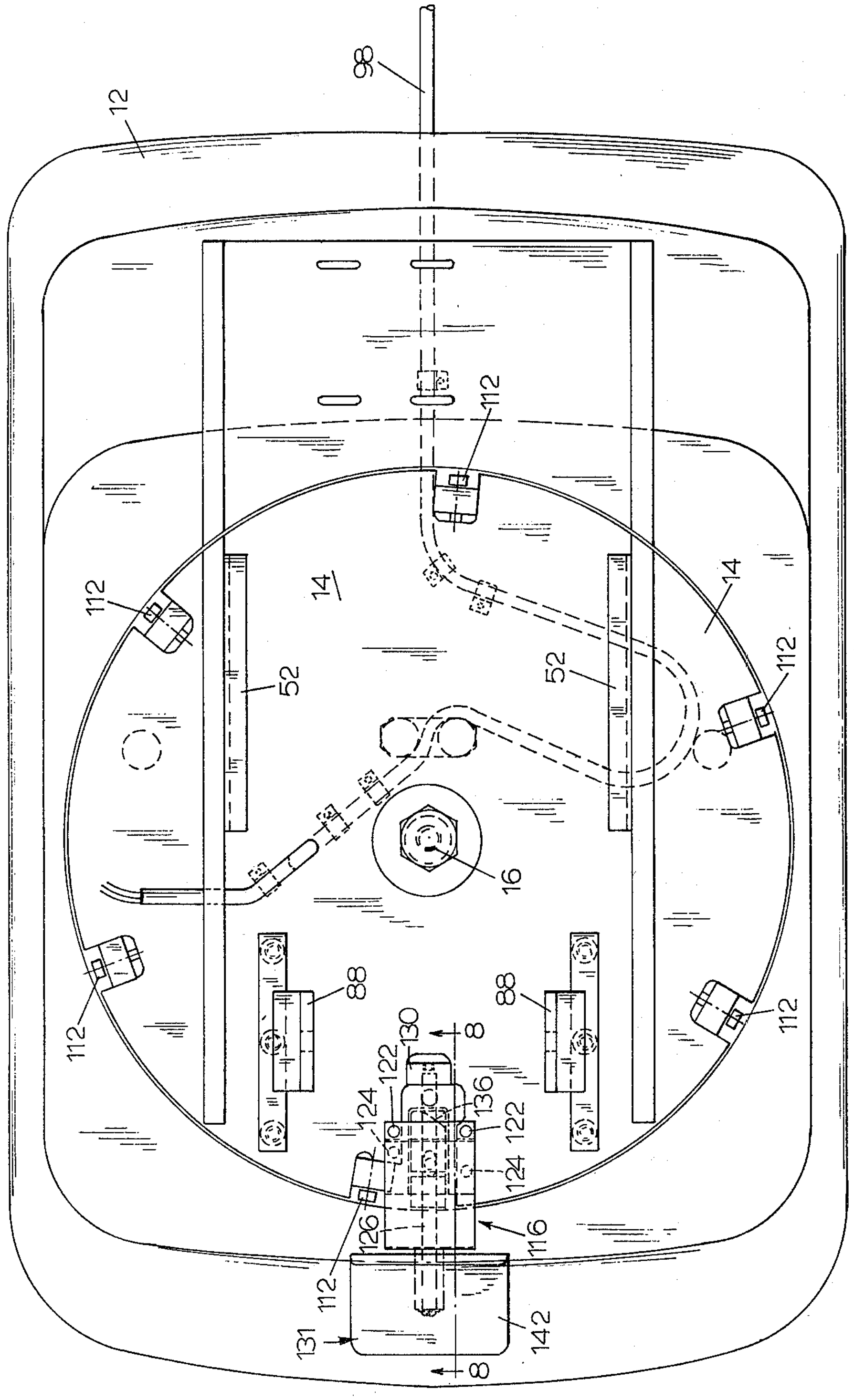
FIG. 7 is a horizontal sectional view of the lowermost portion of the base unit, showing in plan, details of said lowermost portion as seen on the line 7—7 of FIG. 1.

The electric motor 56 is of the reversible type and is controlled by suitable switch means, not shown, which, for example, preferably are mounted upon the back of a chair seat when supported by the upper supporting plate 10. However, the present invention also contemplates foot-operated switch members which are illustrated in FIG. 6 and comprise pedals 96. Referring to FIG. 7, it will be seen that a conduit 98 extends from a suitable source of current, not shown, and is positioned beneath the bottom plate 12 within suitable space therein provided for such conduit, said conduit leading to a terminal board 100, shown in FIG. 6. Said terminal board preferably is enclosed within the housing 58 and appropriate circuit control means, such as relays and the like, not shown, also are included within said terminal board 100. A circuit also extends between the switches 102, which are actuated by the foot pedals 98 and the motor 56. Any additional manually operable switch means, such as those referred to above as being on the back of a chair seat likewise are connected by appropriate circuitry, not shown, to the terminal board 100. It is to be understood that all of such circuitry is relatively simple and of conventional nature and actually does not comprise part of the novelty of the present invention.

For purposes of concealing the lazy tong assemblies 18 and 20 and the mechanism by which the same are actuated, the chair base comprising the present invention is provided with an accordian type flexible cover 102, which is expansible and contractable vertically. The cover extends entirely around the circumference of the upper supporting plate 10 and the upper end of said cover is clamped to the periphery of said supporting plate by a flanged clamping member 104, which surrounds said upper end of cover 102 and any suitable means such as screws or otherwise, not shown, are employed to clamp said upper end of cover 102 to the upper supporting plate 10. Similarly, a stiff shroud 106, which may be formed from metal, molded from plastic or a rigid nature, or otherwise, surrounds the lower portion of the operating mechanism for the lazy tong assemblies 18 and 20. Said Shroud, at the forward end of the base unit, interfits with housing 58 that encloses the electric motor 56 and otherwise is suitably secured to the base plate 14 so as to be movable therewith when the same is rotated about the pivot 16 with respect to the flat bottom plate 12. The lower end of flexible cover 102 also is clamped to an inwardly extending flange 108 on the upper edge of shroud 106 by means of another flanged clamping member 110 which extends around the inner periphery of flange 108 and is secured thereto with the rim of the flexible cover 102 sandwiched therebetween by the use of screws, not shown, or any other suitable means.

As described above, the lazy tong assemblies 18 and 20, the upper supporting plate 10 and all of the operating mechanism for the lazy tong assemblies are mounted upon base plate 14 for support. Said base plate and all of the mechanism mounted thereon is movable about the vertical pivot 16 with respect to the flat bottom plate 12. Such movement of the base plate 14 is facilitated by the provision of a plurality of anti-friction rollers 112, which are positioned within suitable notches formed in the periphery of base plate 14 as best shown in FIGS. 6 and 7. The rollers 112 operate upon a smooth area in the upper face of the flat bottom plate 12. From FIG. 1, it will be seen that the flat bottom plate 12 preferably is provided with a circular recess 114 in the upper surface thereof which receives the base plate 14 and the upper surface of the flat bottom plate 12, which extends outwardly from the periphery of circular recess 114, slopes downwardly around all edges of the plate 12 to prevent accidental tripping of an operator upon the outer periphery of said flat bottom plate 12.

Figure 8:
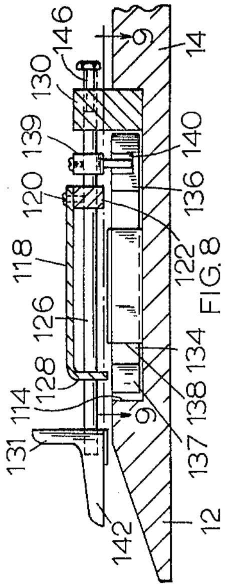
FIG. 8 is a fragmentary vertical sectional view of details of locking mechanism as seen on the line 8—8 of FIG. 7.

After the base plate 14 has been disposed in a desired rotary position with respect to the flat bottom plate 12, it is locked in said position by a relatively simple but effective locking means in the nature of a brake unit 116. Details of said brake unit 116 are best illustrated in FIGS. 6–9, and the details thereof are as follows:

A bridging plate 118 is secured by suitable screws 120, see FIG. 8, to a supporting block 122, which is connected by additional screws 124 to base plate 14. A shaft 126 extends through suitable bearings in the outer flange 128 and supporting block 122, said shaft extending beyond both of said bearings. A foot treadle 131 is secured to the forward end of shaft 126. The opposite end of shaft 126 is received within a suitable bearing hole in another supporting block 130, which is fixed by welding within a suitable recess 132 formed within the base plate 14.

Also supported within the recess 132 is a slide 134 which, on the inner end thereof has a cam surface 136. The outer end of slide 134 has a brake block 137 of friction material fixed thereto for engagement with the wall of circulr recess 114 in the flat bottom plate 12, as clearly shown in FIGS. 8 and 9. Slide 134 is guided for radial movement within recess 132 by a suitable channeled bracket 138, the outer ears of which overlie the top surface of base plate 14, as clearly shown in FIG. 9, and are secured to said surface by appropriate screws.

Figure 9:
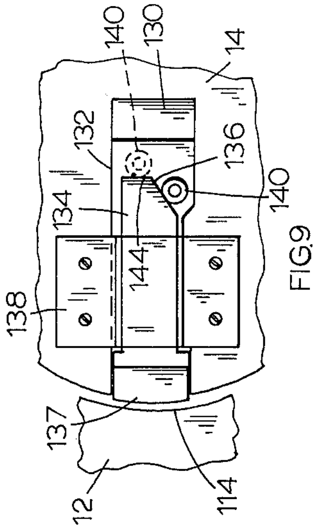
FIG. 9 is a fragmentary horizontal sectional view of the locking mechanism, as seen on line 9—9 of FIG. 8.

Adjustably mounted upon the shaft 126 between the supporting blocks 122 and 130 is a cam actuator comprising a head 139, see FIG. 8, secured by a set screw to the shaft. The head 139 has a small shaft projecting therefrom which rotatably supports a roller 140 which, as best shown in FIG. 9, engages cam surface 136 when the end 142 of foot treadle 131 is depressed. Following the initial engagement of the end 142 of foot treadle 131 by the foot of the operator, continued movement of said end 142 will cause the roller 140 to move from the full line position thereof shown in FIG. 9 to the dotted line position, and such movement causes the brake block 137 to be moved into firm frictional engagement with the vertical wall of the circular recess 114 in flat bottom plate 12, and thereby lock the base plate 14 against any further rotation with respect to the flat bottom plate 12.

When the roller 140 is in the dotted line position thereof shown in FIG. 9, it abuts the flat transverse end 144 of slide 134 and when in this position, it will automatically be retained therein until the opposite end of the foot treadle 131 is depressed, whereby such movement will restore the roller 140 to the full line position thereof shown in FIG. 9, and thereby unlatch the brake block 137 so as to free the base plate 14 for rotation, when desired. From FIG. 8, it also will be seen that a screw 146 is threaded into supporting block 130 coaxially with the socket therein which receives one end of shaft 126. The inner end of screw 146 abuts said socketed end of shaft 126 and thereby assures effective operation of the cam-actuating roller 140, since the screw 146 prevents axial movement of the shaft 126 toward the right as viewed in FIG. 8. Therefore, it will be seen that the chair base comprising the present invention includes a simple but effective mechanism for locking and unlocking the base plate 14 and the mechanism supported thereby against rotation relative to the recess 114 within which base plate 14 is positioned relative to flat bottom plate 12.

From the foregoing, it will be seen that the present invention provides a chair base which is capable of elevating and lowering an operatory chair seat and back, such as those commonly used in detail operatories and other similar uses in the medical profession such as ophthalmology and other areas of the medical profession. The lazy tong mechanism is of such nature that it permits the seat of a chair to be extended to a very low position and the compact arrangement of the operating mechanism for the lazy tong systems also has been designed to achieve this advantageous result. The pair of lazy tong systems which are disposed in transversely spaced relationship are adequately braced to prevent swaying or canting of the seat and back when supported by said base. Further, the elevation of the seat from its lowest position occurs smoothly and gently due to the particular linkage and bell crank arrangment which actuates the lazy tong system. Further, substantial mechanical advantage is provided to effect such raising and lowering of a chair seat by said base, whereby a relatively low-powered electric motor is fully capable of effecting such raising and lowering of a chair seat and back by said base. Further, all of the lazy tong systems and the power mechanism to expand and contract the same is enclosed within attractive expansible cover means and all of said mechanism is rotatable upon a bottom plate which rests upon a supporting surface, such as a floor and, following a rotation of the chair base unit relative to said bottom plate, effective brake means are provided to secure said rotatable base unit in a desired position upon said bottom plate.

While the invention has been described and illustrated in its several preferred embodiments, it should be understood that the invention is not to be limited to the precise details herein illustrated and described since the same may be carried out in other ways falling within the scope of the invention as illustrated and described.

We claim:

1. An operatory chair base comprising in combination, a support member adapted to have a seat for an operatory chair attached thereto for positioning said seat at desired vertical positions within predetermined limits above a supporting surface, base means adapted to be positioned upon said supporting surface, a pair of parallel lazy tong assemblies each comprising pairs of crossed links pivotally connected to each other and said assemblies being operable within vertical planes spaced transversely apart a limited distance and positioned for operation between said support member and base means, means pivotally connecting one end of certain of said links respectively to said base means and said support member and the corresponding ends of certain other of said links respectively being slidably connected to said base means and support member, said assemblies being operable in unison when extended and retracted respectively to raise and lower said support member relative to said base means, pivot means connecting at least one pair of said links of each assembly intermediately of the ends thereof, a linkage system supported by said base means and interconnected respectively to said pivot means for said one pair of links of each assembly thereof and operable when moved in opposite directions to move said pairs of links of said lazy tong assembly in corresponding contracting and expanding vertical directions to move said support member in similar vertical directions, said linkage system comprising stationary pivot means fixed to said base, a pair of similar bell cranks spaced transversely and mounted between said lazy tong assemblies, pivot means connecting said bell cranks to said stationary pivot means, a transverse yoke operable adjacent said base, a pair of connecting rods connected at opposite ends respectively to said yoke and similar ends of said bell cranks, a pair of connecting links connected at opposite ends respectively to the other similar ends of said bell cranks and said pivot means of said one pair of links of each assembly, and power means connected to said linkage system to operate the same in at least one direction to move said lazy tong assembly in expanding direction, said power means comprising a reversible electric motor supported by said base, a drive screw extending along said base and connected at one end to said motor for operation of said screw selectively in opposite directions, bearing blocks fixed to said base and respectively supporting said screw adjacent opposite ends thereof, and said transverse yoke having a threaded bore receiving said screw and being movable by said screw in opposite selected directions to actuate said linkage system to raise and lower said support member relative to said base.

2. The chair base according to claim 1 in which said base means comprises a base plate and a second plate immediately below said base plate and a pivot substantially central thereof connecting said plates for relative rotational movement, said base plate being substantially circular and said second plate being adapted to be disposed upon a supporting surface, said chair base also including anti-friction means supported by one of said plates adjacent the periphery of said base plate at circumferentially spaced locations and adapted to permit pivotal movement of said chair base relative to said second plate about the axis of said pivot with a minimum of effort, and means to releasably secure said base against rotation relative to said second plate.

3. The chair base according to claim 2 in which said means to releasably secure said base against rotation relative to said second plate comprises brake means carried by one of said pivotally movable base members and engageable with the other and having a foot-engageable actuator positioned adjacent the periphery of said second plate of said base means for ready access for locking and releasing operations of said brake means.

4. The chair base according to claim 1 further including a plurality of brace members extending transversely between certain similar links of said pair of lazy tong assemblies and fixedly connected at the ends thereof to the inner faces of said certain similar links to brace said assemblies against lateral sway relative to said base.

5. The chair base according to claim 4 in which one of said brace members extends between portions of the lower ends of certain of said links of said lazy tong assemblies adjacent said screw of said power means and said brace member being provided with a clearance space accommodating said screw when said lazy tong assemblies are in the retracted positions thereof.

* * * * *

UNITED STATES PATENT AND TRADEMARK OFFICE

CERTIFICATE OF CORRECTION

PATENT NO. : 3,982,718

DATED : September 28, 1976

INVENTOR(S) : Richard P. Folkenroth, William G. Mader, Ralph J. Williams

It is certified that error appears in the above-identified patent and that said Letters Patent are hereby corrected as shown below:

Column 1, line 51: Delete "comprise" and substitute --comprises--

Column 2, line 2 of table at top: Delete "OCt." and substitute --Oct.--

Column 3, line 5: Delete "members" and substitute --member--

Column 3, line 59: Delete "anti-fraction" and substitute --anti-friction--

Column 5, line 57: Delete "anti-fraction" and substitute --anti-friction--

Column 7, line 33: Delete "or" first occurrence and substitute --of--

Column 8, line 22: Delete "circulr" and substitute --circular--

Column 9, line 2: Delete "detail" and substitute --dental--

Signed and Sealed this

Eighteenth Day of January 1977

[SEAL]

*Attest:*

RUTH C. MASON
*Attesting Officer*

C. MARSHALL DANN
*Commissioner of Patents and Trademarks*